(12) United States Patent
Dearien et al.

(10) Patent No.: US 9,769,060 B2
(45) Date of Patent: Sep. 19, 2017

(54) SIMULATING, VISUALIZING, AND SEARCHING TRAFFIC IN A SOFTWARE DEFINED NETWORK

(71) Applicant: Schweitzer Engineering Laboratories, Inc., Pullman, WA (US)

(72) Inventors: Jason A. Dearien, Moscow, ID (US); Marc Ryan Berner, Monroe, WA (US); Josh Powers, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 39 days.

(21) Appl. No.: 14/803,733

(22) Filed: Jul. 20, 2015

(65) Prior Publication Data

US 2017/0026276 A1    Jan. 26, 2017

(51) Int. Cl.
*H04L 12/26* (2006.01)
*H04L 12/707* (2013.01)
*H04L 12/24* (2006.01)

(52) U.S. Cl.
CPC .......... *H04L 45/22* (2013.01); *H04L 41/0663* (2013.01); *H04L 41/12* (2013.01); *H04L 41/145* (2013.01); *H04L 43/045* (2013.01); *H04L 41/22* (2013.01)

(58) Field of Classification Search
None
See application file for complete search history.

(56) References Cited

U.S. PATENT DOCUMENTS

| | | |
|---|---|---|
| 6,747,957 B1 | 6/2004 | Pithawala |
| 7,218,632 B1 | 5/2007 | Bechtolsheim |
| 7,376,831 B2 | 5/2008 | Kollmyer |
| 7,872,983 B2 | 1/2011 | Lai |
| 8,553,544 B2 | 10/2013 | Lai |
| 8,800,044 B2 | 8/2014 | Raad |
| 9,237,129 B2 | 1/2016 | Ling |
| 9,286,171 B2 | 3/2016 | Cardiba |
| 2002/0172157 A1 | 11/2002 | Rhodes |
| 2003/0112821 A1 | 6/2003 | Cleveland |

(Continued)

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Alex Skripnikov
(74) *Attorney, Agent, or Firm* — Jared L. Cherry; Richard M. Edge

(57) ABSTRACT

The present disclosure pertains to systems and methods for simulating data packet routing within a software defined network ("SDN"), visualizing the results of the simulation, and permitting a user to search the resulting simulation. In one specified embodiment, a system may receive from a user a simulation parameter associated with a packet to be simulated in the SDN. A packet based on the at least one simulation parameter may be generated. A response of the SDN to the packet may be simulated by identifying applicable traffic routing rules and identifying a subsequent destination based on the applicable traffic routing rules. A record of the subsequent destination may be added to the simulation result, and the process may continue until a terminating condition is satisfied.

19 Claims, 8 Drawing Sheets

(56) References Cited

U.S. PATENT DOCUMENTS

| | | | |
|---|---|---|---|
| 2003/0125924 A1* | 7/2003 | Lines | H04L 29/06 |
| | | | 703/20 |
| 2003/0188159 A1 | 10/2003 | Josset | |
| 2008/0005558 A1 | 1/2008 | Hadley | |
| 2011/0087952 A1 | 4/2011 | Marin | |
| 2013/0212285 A1 | 8/2013 | Hoffmann | |
| 2013/0294228 A1 | 11/2013 | Ahuja | |
| 2014/0029451 A1 | 1/2014 | Nguyen | |
| 2014/0226467 A1 | 8/2014 | Park | |
| 2014/0376406 A1 | 12/2014 | Kim | |
| 2015/0312658 A1 | 10/2015 | Winzer | |
| 2015/0363522 A1* | 12/2015 | Maurya | H04L 43/50 |
| | | | 703/13 |
| 2016/0043996 A1 | 2/2016 | Syed Mohamed | |
| 2016/0119299 A1 | 4/2016 | Amulothu | |
| 2016/0142427 A1 | 5/2016 | de los Reyes | |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

* cited by examiner

SIMULATING, VISUALIZING, AND SEARCHING TRAFFIC IN A SOFTWARE DEFINED NETWORK

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for simulating data packet routing within a software defined network ("SDN") and visualizing the results of the simulation.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
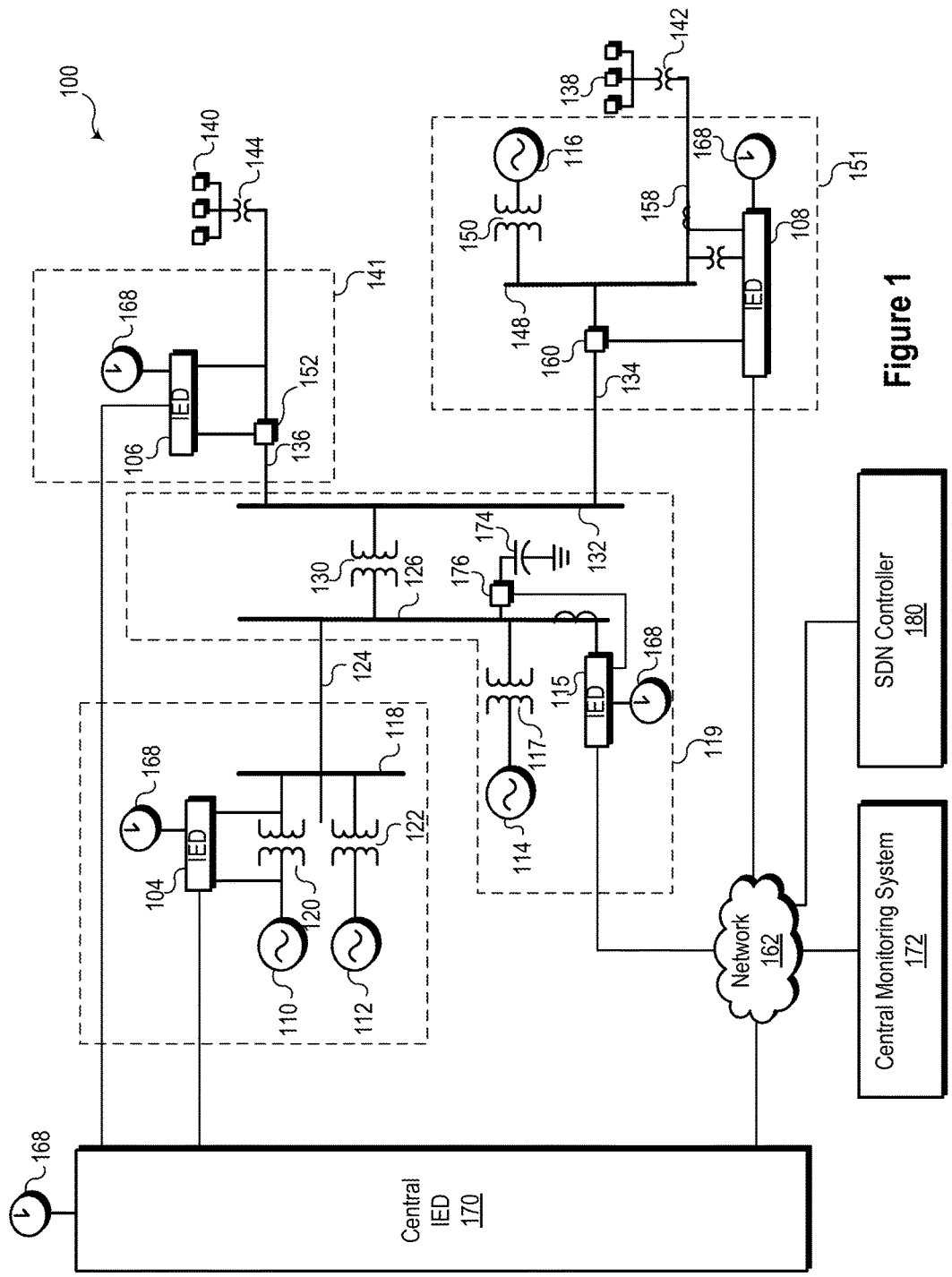
FIG. 1 illustrates a simplified one-line diagram of an electric power transmission and distribution system in which a plurality of communication devices may facilitate communication in a software defined network consistent with embodiments of the present disclosure.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information utilized for the proper assessment of power system conditions and for implementing control actions based on such conditions. Such messages may be subject to time constraints because of the potential for rapid changes in conditions in an electric power transmission and distribution system. In other words, if the messages are delayed, the data in the messages may no longer be accurate or useful to a receiving device.

Some electric power transmission and distribution systems may incorporate software defined network ("SDN") technologies that utilize a controller to configure and monitor on the network. SDN technologies offer a variety of features that may be advantageous in electric power systems (e.g., deny-by-default security, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific traffic flows through the communication network. A traffic flow, as the term is used herein, refers to a set of parameters used to match and take action based on network packet contents. Traffic flows may permit specific paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting the forwarding tables in the devices. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a selected traffic flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Determining the destination of traffic flows and tracking of packets may be challenging in large networks. In particular, networks that utilize multi-cast messages, may present challenges to managing the transmission of data within a network and ensuring that such traffic is correctly routed. The inventors of the present disclosure have recognized that the ability to simulate and visualize the flow of data in a network may be useful for design, testing, and troubleshooting of the network. For example, when designing a new network the systems and methods of the present disclosure may be used to validate that the network will function as designed. Further, the inventors of the present disclosure have recognized that the ability to search for data flows having certain attributes may aid in the design, operation, and troubleshooting of data networks. For example, a simulation consistent with the present disclosure may aid in identifying determining the cause of a data flow not reaching an intended destination.

Systems and methods consistent with the present disclosure may permit a network engineer or other user to simulate, against the existing or proposed flows of the network, a packet, or portion of a packet, and find where that packet would or would not traverse the network. The simulation may be presented to the user graphically, with the data flows illustrated in a visual representation. Further, the user may be allowed to search for data flows using a variety of criteria. In some embodiments, the search criteria may include a source, a destination, a priority, a data type, a data protocol, a MAC address, a source, a VLAN identifier, and the like.

In some embodiments, a single packet, or even a partial packet, could be described and then simulated on a network diagram. The simulation may be presented to a user as a visual representation of all the paths a packet with that signature could take. In some embodiments, the visual representation may include arrows indicating the direction the packet would take between two switches. In some embodiments, different colors may be utilized to identify multiple paths (e.g., alternative or backup paths) that a packet may follow. Visualization of the path may allow a user to confirm that the data flow is configured properly (e.g., the data flow reaches a specified destination, the data flow does not traverse certain portions of a network, etc.).

In some embodiments, multiple data paths may be identified for packets having wild card information that affects the routing of the packet or where traffic flow rules may result in multiple routing paths. Visualizing multiple paths may help a user to identify data flows that reach unintended areas of a network. In some circumstances, identification of devices that result in multiple paths may aid a user in eliminating traffic that reaches unintended portions of a data network.

In some embodiments, a simulation system may be able to display the flow tables of any network switch and identify the specific processing rules that are applicable to a particular scenario. The simulation system may also be configured to process partial packets. If the search packet is a partial packet description, multiple traffic routing rules may be applicable. For example, a source MAC address may be represented as a wild card, if a rule matched another field (e.g., IP address) but also had a criterion for a source MAC address this flow may be identified as a possible match, but not a complete match.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

Systems such as system 100 utilized in connection with electric power transmission and distribution systems may involve a large number of devices. The devices may each require that specific communication flows be enabled to allow communications to travel from a source to a destination through network 162. To assist in the design, commissioning, and troubleshooting of network 162, various systems and methods disclosed herein may simulate the communication flows through 162 and present the results to the user graphically. Further, the user may be allowed to search for data flows using a variety of criteria. In some embodiments, the search criteria may include a destination, a priority, a data type, a data protocol, a MAC address, a source, a VLAN identifier, and the like.

Figure 2:
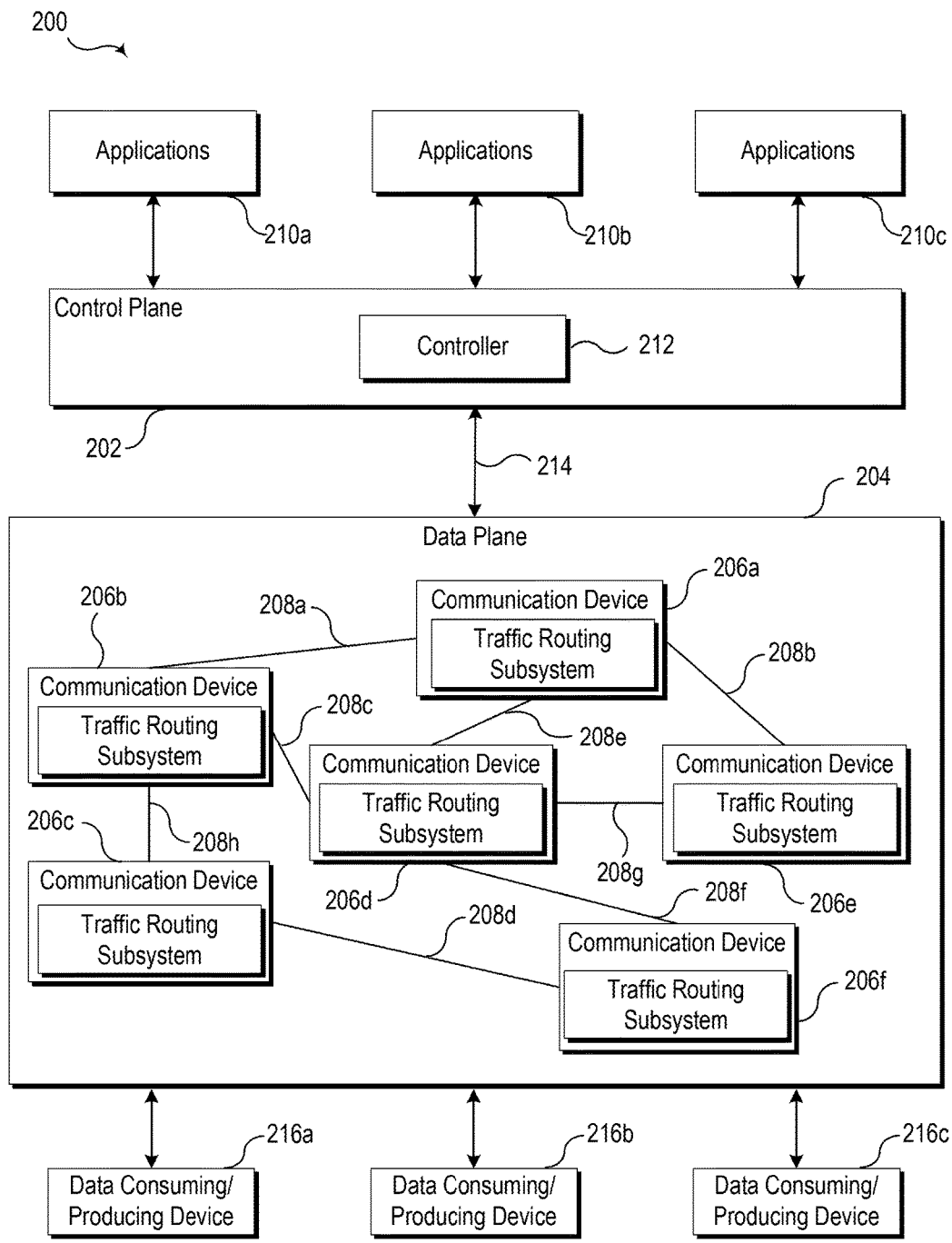
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 216a-216c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish traffic flows. The controller may specify rules for routing traffic through the data plane 204 based on a variety of criteria.

As illustrated, the data plane 204 includes a plurality of communication devices 206a-206f in communication with one another via a plurality of physical communication links 208a-208h. In various embodiments, the communication devices 206a-206f may be embodied as by a variety of devices configured to communicate with the controller 212 and to operate in data plane 204. Of course, not all devices in a SDN need to be capable of communicating with the controller. The physical communication links 208a-208h may be embodied as Ethernet, fiber optic, and other forms of data communication channels. As illustrated, the physical communication links 208a-208h between the communication devices 206a-206f may provide redundant connections such that a failure of one of the physical communication links 208a-208h is incapable of completely blocking communication with an affected communication device. In some embodiments, the physical communication links 208a-208h may provide an N−1 redundancy or better.

The plurality of applications 210a-210c may represent a variety of applications 210a-210c operating in an applications plane. In the SDN architecture illustrated in FIG. 2, controller 212 may expose an application programming interface (API) that services 210a-210c can use to configure the data plane 204. In this scenario, controller 212 may act as an interface to the data plane 204 while the control logic resides in the applications 210a-210c. The configuration of controller 212 and applications 210a-210c may be tailored to meet a wide variety of specific needs.

The data consuming/producing devices 216a-216c may represent a variety of devices within an electric power transmission and distribution system that produce or consume data. For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, etc.) and may communicate the measurements to implement a protection strategy for the transmission line. Traffic between the transmission line relays may be routed through the data plane 204 using a plurality of traffic flows implemented by controller 212. Of course, data consuming/producing devices 216a-216c may be embodied by a wide range of devices consistent with embodiments of the present disclosure.

The plurality of communication devices 206a-206f may each include a traffic routing system configured to route traffic through data plane 204. Traffic routing subsystems may be configured to implement a series of rules for routing data traffic through communication links 208a-208h.

Figure 3A:
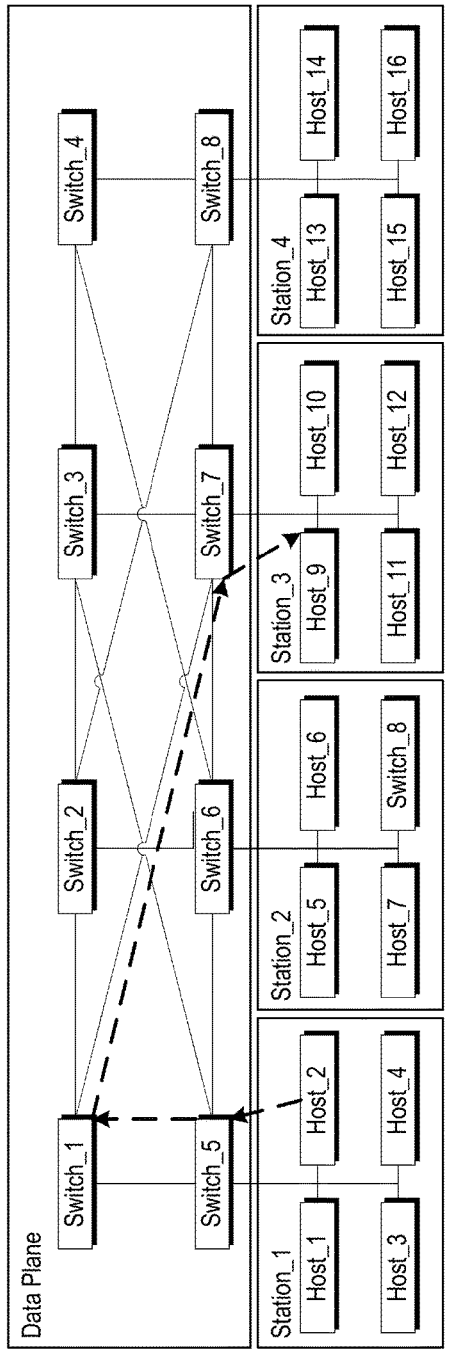
FIG. 3A illustrates a conceptual representation of a predicted traffic flow in an SDN consistent with embodiments of the present disclosure.

FIG. 3A illustrates a conceptual representation of a predicted traffic flow in an SDN consistent with embodiments of the present disclosure. In the illustrated embodiment, a plurality of switches 1-8 may comprise a data plane that connects a plurality of hosts 1-16. The hosts are separated in four stations 1-4. The physical connections between the switches and the hosts are illustrated.

The predicted flow may be determined using a simulation system configured to simulate the response of an SDN to a specified user parameter. The specified parameter may be sufficient to generate one or more data packets that may be communicated through the SDN. A plurality of traffic routing rules may be analyzed that are applicable to an initial starting point of the simulation. A subsequent destination may be identified based on the applicable traffic routing rules and the initial location. The same process may be repeated at the subsequent destination to determine another destination. Similarly, the process may be repeated as a message propagates through any number of destinations in the network. As each destination is identified, an associated record may be generated in a simulation. A simulation may be terminated when a terminating condition is satisfied. Various simulations may terminate on a variety of conditions. For example, terminating conditions may include a network packet reaching a destination, a network packet being dropped or blocked from further transmission, the simulation completing a specified number of iterations, etc.

In FIG. 3A, a simulated traffic flow originates from Host_2 and is communicated to Switch_5, from Switch_5 to Switch_1, from Switch_1 to Switch_7, and from Switch_7 to Host_9. The simulated traffic flow is illustrated by a plurality of arrows shown in dashed lines. Each of Switch_1, Switch_5, and Switch_7 may comprise a plurality of rules for processing traffic. In the simulation, these rules may be analyzed to determine the flow of data shown in FIG. 3A.

Figure 3B:
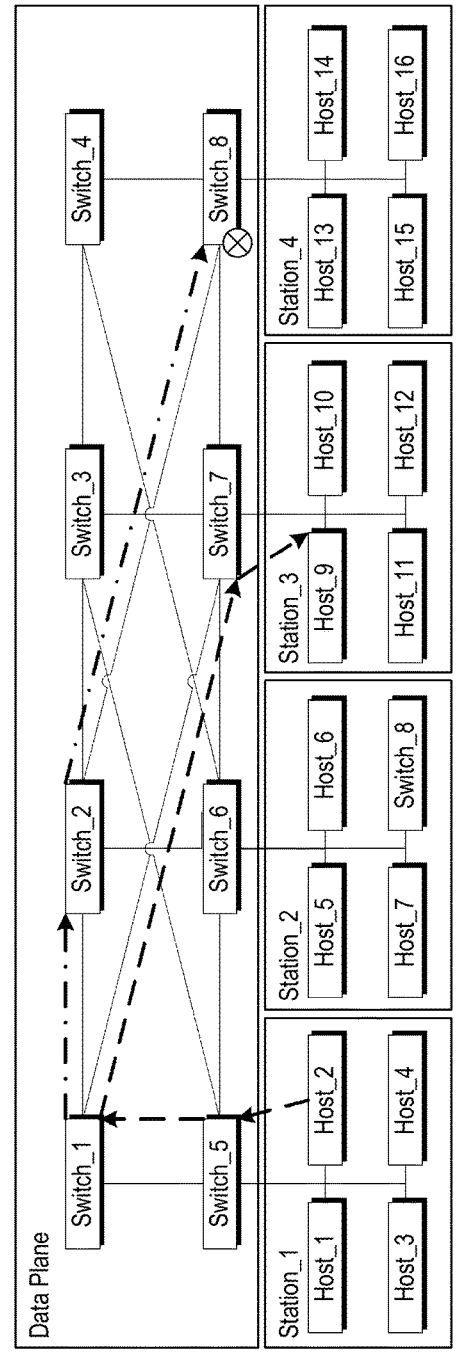
FIG. 3B illustrates a conceptual representation of a predicted traffic flow in an SDN in which a traffic flow results in duplication of traffic consistent with embodiments of the present disclosure.

FIG. 3B illustrates a conceptual representation of a predicted traffic flow in an SDN in which a traffic flow results in duplication of traffic consistent with embodiments of the present disclosure. In the illustrated embodiment, a data packet originates with Host_2 that is communicated to Switch_5 and from Switch_5 to Switch_1. At Switch_1, the data packet is routed to both Switch_2 and Switch_7. The traffic flow may be intended to be communicated from Switch_7 to Host_9. The duplicated traffic may be communicated from Switch_2 to Switch_8 and from Switch_8 to Switch_7. At Switch_8 the duplicated traffic flow may be dropped. The simulation results may permit a user to visually identify the source of the duplication of the traffic.

Figure 3C:
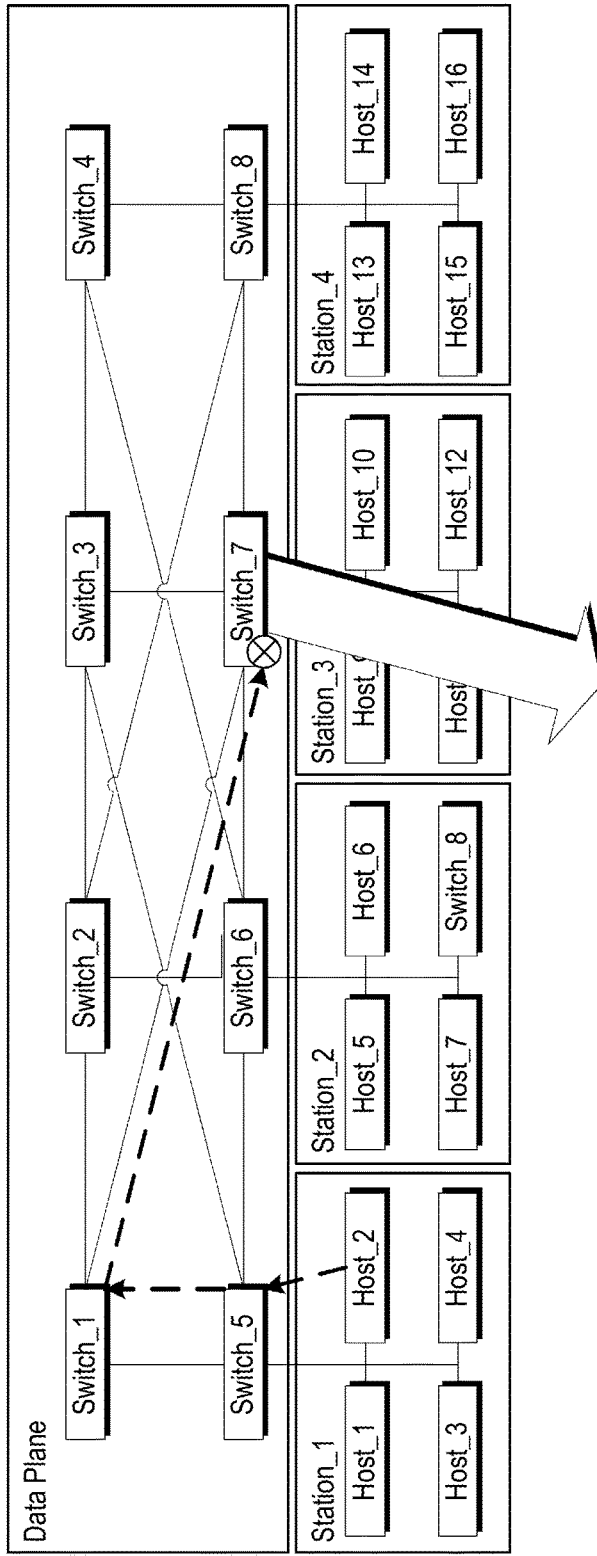
FIG. 3C illustrates a conceptual representation of a predicted traffic flow in an SDN in which a traffic flow is blocked consistent with embodiments of the present disclosure.

FIG. 3C illustrates a conceptual representation of a predicted traffic flow in an SDN in which a traffic flow is blocked consistent with embodiments of the present disclosure. In the illustrated embodiment, a data packet originates with Host_2 that is communicated to Switch_1 via Switch_5. From Switch_1 the packet is routed to Switch_7. At Switch_7, the data packet is dropped by Switch_7. Various embodiments of the present disclosure may aid in determining why a packet is not properly routed from a source to a destination on the network. In one example, a user may troubleshoot such a situation by conducting a simulation associated with the area of interest. The simulation may evaluate the traffic flows on the network and visualize the traffic flow as a series of arrows illustrated using a dashed line.

A user may identify that the traffic flow is dropped at Switch_7. In various embodiments a user may be able to display a flow table associated with the network device. The user may cause the flow table to be displayed by clicking on the switch to be displayed. In some embodiments, one or more rules applicable to the simulation may be identified. In the illustrated embodiment, rules 2 and 3 are applicable; however, the rules may be evaluated in order. As such, as a result of the execution of rule 2, the data traffic may be discarded. As such, even though the criteria of rule 3 are satisfied and applicable to the simulation, the traffic is not routed according to rule 3. As such, the user may change the priority of rules 2 and 3 such that the traffic is forwarded to Host_9.

Figure 3D:
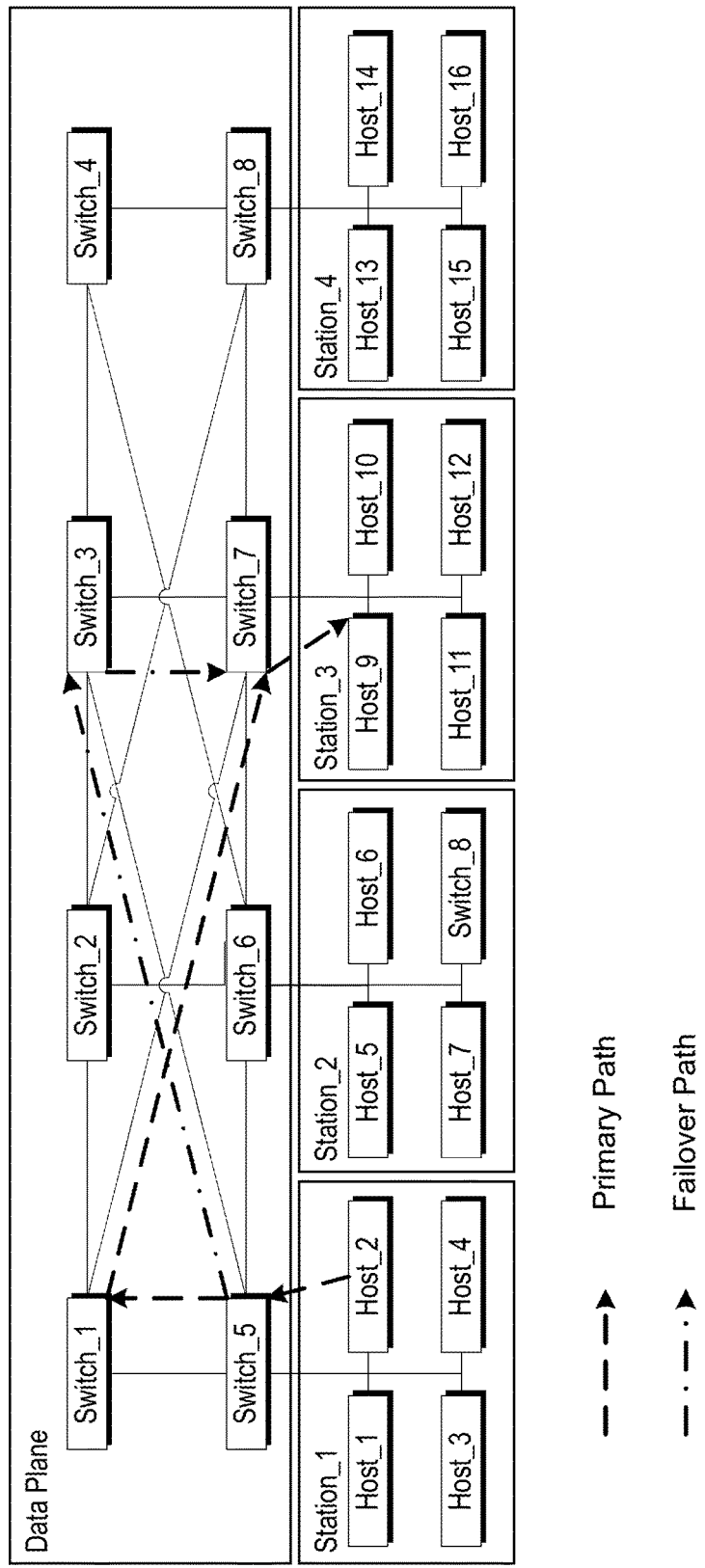
FIG. 3D illustrates a conceptual representation of a predicted primary traffic flow and a predicted backup traffic flow in an SDN consistent with embodiments of the present disclosure.

FIG. 3D illustrates a conceptual representation of a predicted primary traffic flow and a predicted failover traffic flow in an SDN consistent with embodiments of the present disclosure. In the illustrated embodiment, a primary path of a packet that originates with Host_2 includes communication to Switch_5, from Switch_5 to Switch_1, from Switch_1 to Switch_7, and from Switch_7 to Host_9. A failover path may be utilized in the event of a disruption in any of the communication paths or devices in the primary path. The failover path of the packet that originates with Host_2 includes communication to Switch_5, from Switch_5 to Switch_3, from Switch_3 to Switch_7, and from Switch 7 to Host_9. Illustrating the primary path, the failover path may allow a user to ensure that traffic associated with a flow, whether through a primary or failover path, may remain within a specified portion of the network.

Figure 4A:
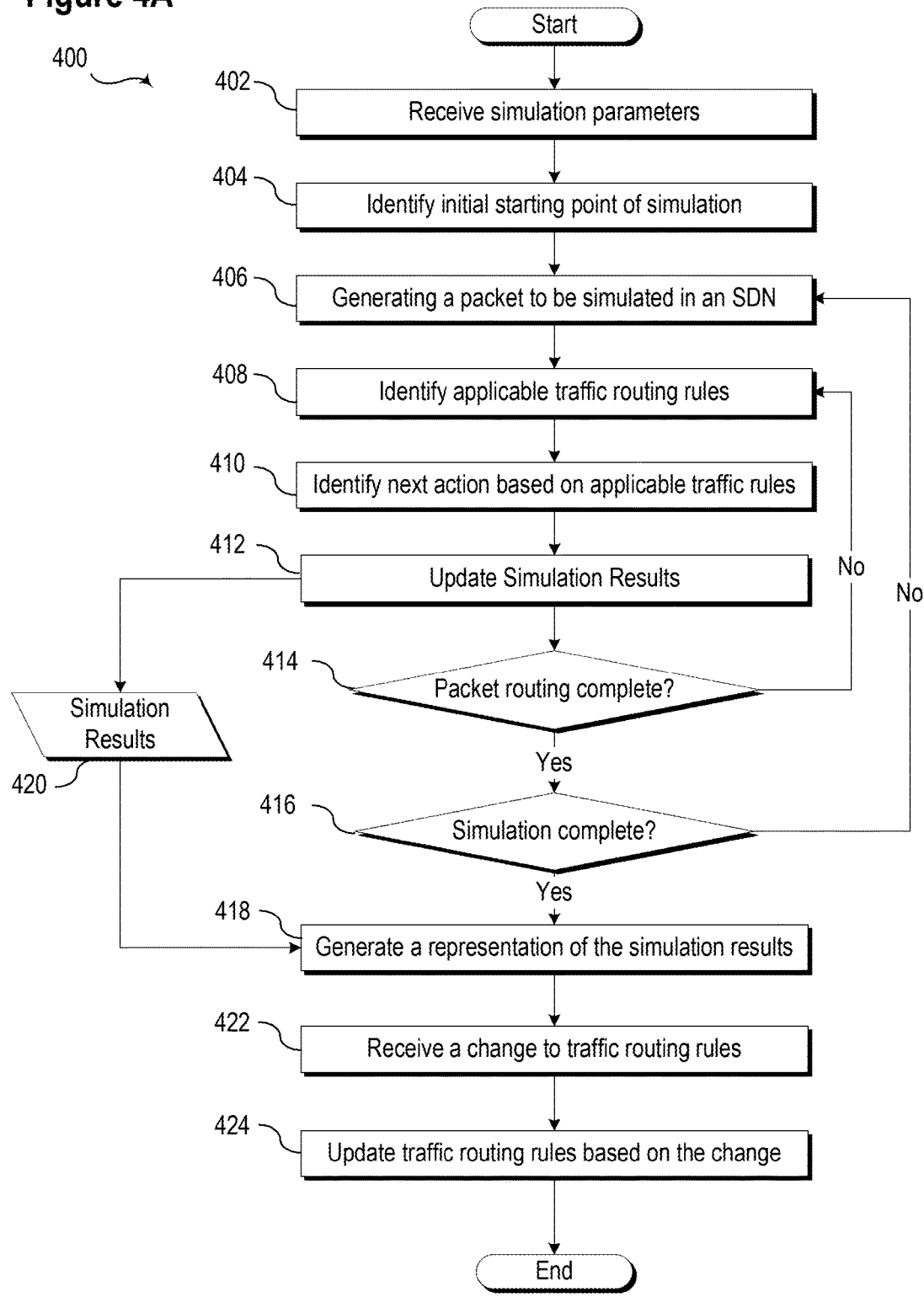
FIG. 4A illustrates a flow chart of a method for simulating, visualizing, and searching traffic in an SDN consistent with embodiments of the present disclosure.

FIG. 4A illustrates a flow chart of a method for simulating visualizing, and searching traffic in an SDN consistent with embodiments of the present disclosure. At 402, simulation parameters may be received. The simulation parameters may be embodied in a variety of ways, including a network packet whose path through the network is to be simulated, a partial network packet that may reflect how a variety of packets with different values may be routed through the network, a simulation of a plurality of data packets, etc. The simulation parameters may represent a relatively small scale simulation (e.g., determining the routing of a single network packet through the network) or may represent a large scale simulation (e.g., simulating a large volume of network traffic over an extended period of time).

At 404, an initial starting point of the simulation may be determined. In some examples, the starting point may be easily determined (e.g., in the case where a single network packet is simulated, the starting point of the simulation may be the source of the packet). In other examples, it may be desirable to specify where the simulation should begin so that the evaluation of the rules start in an area of interest (e.g., a specific IED experiencing an issue requiring troubleshooting).

At 406, a packet to be simulated may be generated. In some examples, the packet may be easily determined (e.g., in the case where a single network packet is simulated), while in other cases, the simulation parameters may be utilized to generate a series of packets to be simulated.

After a packet is generated at 406 and an initial starting point is identified at 404, applicable traffic routing rules may be identified at 408. More specifically, in an SDN the traffic routing rules associated with each device may be specified by an SDN controller. This configuration information may be utilized to conduct an offline simulation of each device and of the network as a whole. The simulated packet may be analyzed with respect to the traffic routing rules applied by a specific device to identify the next action based on applicable traffic routing rules, at 410. The simulation results 420 may be updated at 412 with next action identified at 410.

At 414, method 400 may determine whether the packet routing is complete. The determination of whether the packet routing is complete may be based on delivery of the packet to a specified destination, dropping of the packet, etc. Once the packet's route through network is complete, method 400 may determine whether the simulation is complete at 416.

At 418, a representation of the simulation results may be generated. The representation may be presented to the user graphically, with the simulated data flows illustrated in a visual representation. For example, visual representations similar to those shown in FIG. 3A through FIG. 3D may be generated using the simulation results 420.

A simulation may be terminated when a terminating condition is satisfied. Various simulations may terminate on a variety of conditions. For example, terminating conditions may include routing of all packets in a simulation to a destination, all packets in the simulation being dropped or blocked from further transmission, the simulation completing a specified number of iterations, etc.

At 422, a change to applicable traffic routing rule may be received in some embodiments. The change may reflect a change made by a user after analysis of the representation of the simulation result. As discussed in connection with FIG. 3C, a user may be allowed to access flow tables associated with various devices and may alter the flow tables to correct issues relating to operation of the network. The traffic routing rules may be updated at 424.

Figure 4B:
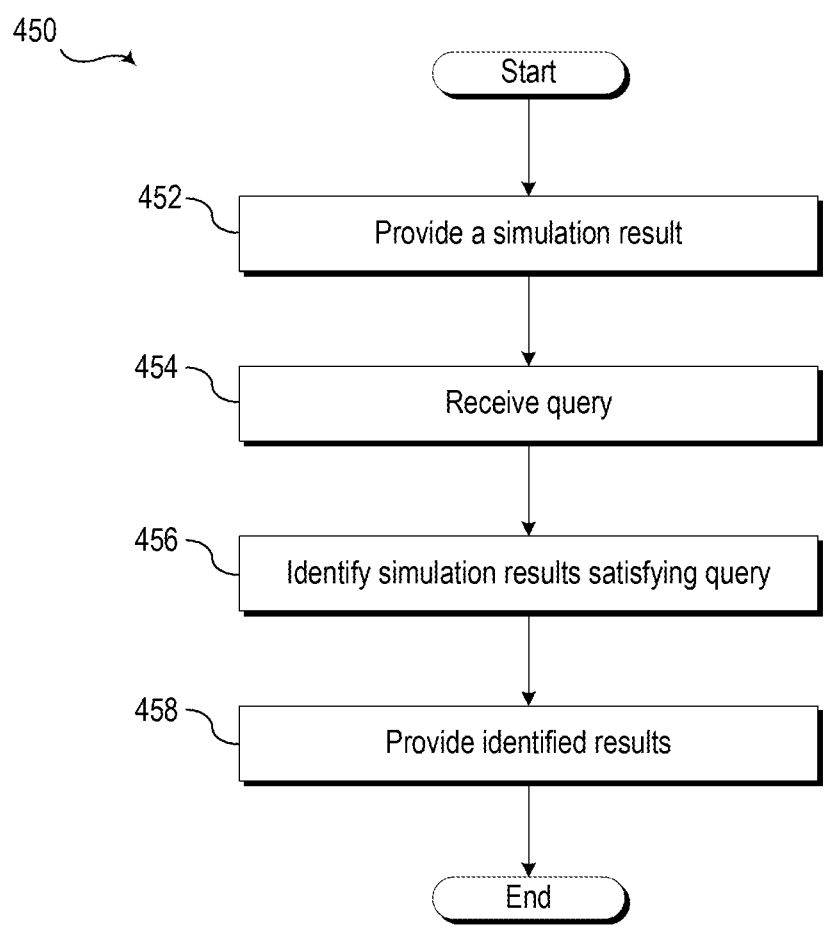
FIG. 4B illustrates a method of searching a simulation result based on a user-specified query consistent with embodiments of the present disclosure.

FIG. 4B illustrates a method 450 of searching a simulation result based on a user-specified query consistent with embodiments of the present disclosure. At 452, a simulation results may be provided. In various embodiments, the simulation result may be created using method 400, illustrated in FIG. 4A. Returning to a discussion of FIG. 4B, method 450 may receive a query from a user at 454. The query may be based on a variety of criteria, including a source, a destination, a priority, a data type, a data protocol, a MAC address, a VLAN identifier, and the like.

At 456, simulation results satisfying the query may be identified and provided to the user at 458. In some embodiments, the identified simulation results may be provided graphically to a user. In some embodiments, such representation may include traffic flows overlaid on a network diagram similar to the illustrations shown in FIGS. 3A-3D. In other embodiments, the representations may take a variety of other forms.

Figure 5:
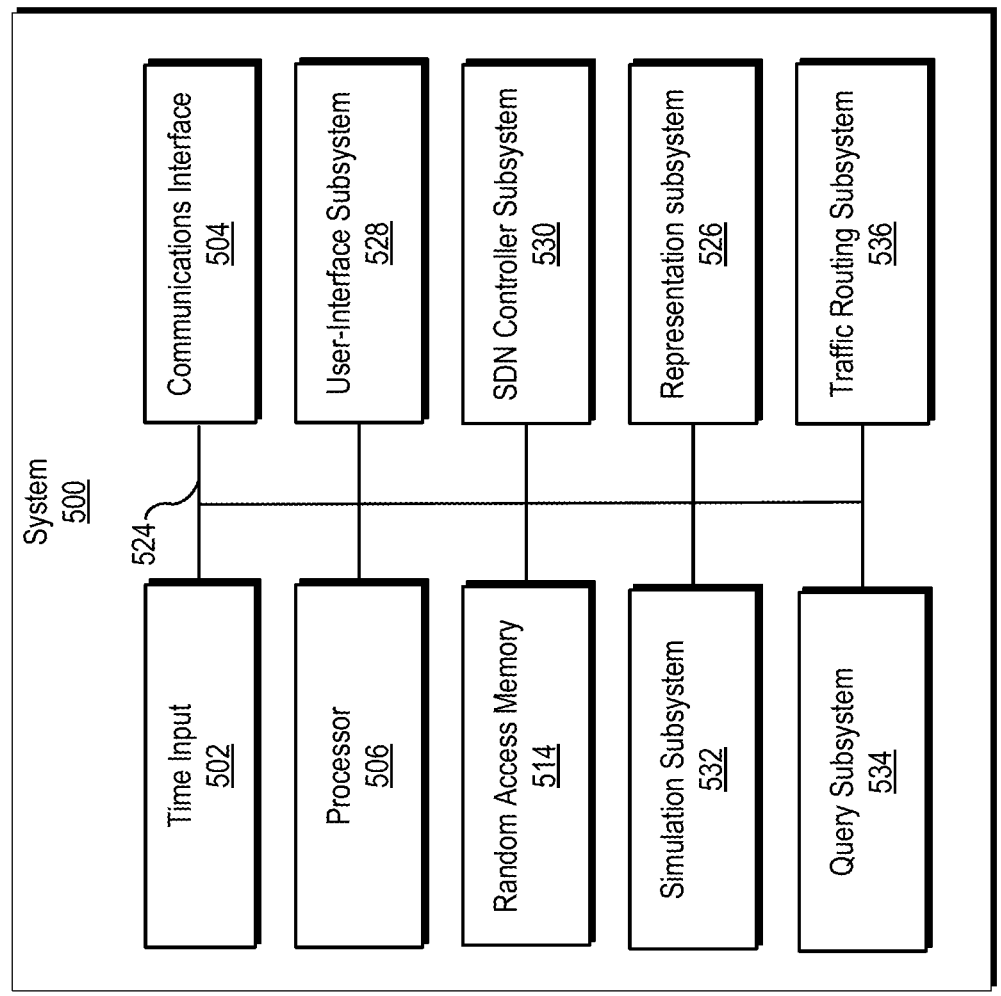
FIG. 5 illustrates a block diagram of a system configured to simulate, visualize, and search traffic in an SDN consistent with embodiments of the present disclosure.

FIG. 5 illustrates a block diagram of a system 500 configured to simulate, visualize, and search traffic in an SDN consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 500 includes a communications interface 504 configured to communicate with other devices (not shown). Communications interface 504 may facilitate communications with multiple devices. System 500 may further include a time input 502, which may be used to receive a time signal (e.g., a common time reference) allowing system 500 to apply a time-stamp received data. In certain embodiments, a common time reference may be received via communications interface 504, and accordingly, a separate time input may not be required. One such embodiment may employ the IEEE 1588 protocol. A data bus 524 may facilitate communication among various components of system 500.

Processor 506 may be configured to process communications received via communications interface 504 and time input 502 and to coordinate the operation of the other components of system 500. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of traffic flows. A user-interface subsystem 528 may be configured to receive from a user various types of information. Such information may include queries for information from simulation results, data parameters associated with simulations to be performed, changes to traffic routing rules, and the like.

In some embodiments, the features associated with simulation systems disclosed herein may be performed by an SDN controller or in conjunction with an SDN controller. An SDN controller may be configured to perform a variety of functions associated with an SDN. The SDN controller subsystem 530 may implement various SDN controller functions directly, or the SDN controller subsystem 530 may be configured to coordinate operations of system 500 with an SDN controller (not shown). The SDN controller subsystem 530 may be configured to specify the configuration of various devices associated with a traffic flow.

A simulation subsystem 532 may be configured to conduct simulation consistent with the present disclosure. In some embodiments, the simulation system may be configured to implement method 400, as illustrated in FIG. 4A. In other embodiments, the simulation subsystem 532 may be configured to implement more or fewer features than are shown in FIG. 4A. Returning to a discussion of FIG. 5, the simulation may proceed by analyzing a plurality of traffic routing rules applicable to a data packet at a specified device in the network. A subsequent destination may be identified based on the applicable traffic routing rules and the current location. The same process may be repeated at the subsequent destination to determine another destination. Similarly, the process may be repeated as a message propagates through any number of destinations in the network. As each destination is identified, an associated record may be generated in a simulation.

In some embodiments, the simulation subsystem 532 may further be configured to generate a representation of a failover path in connection with the simulation. Determination of the failover path may be performed in a similar manner to the determination of the primary path.

A representation subsystem 526 may be configured to generate a representation of the simulation results. The representation subsystem 526 may be configured in various embodiments to visualize a plurality of traffic flows overlaid on a network diagram or to demonstrate traffic flows in a variety of other ways. In embodiments in which a failover path is simulated, the representation subsystem 526 may further be configured to represent the simulated failover path.

Traffic routing subsystem 536 may be operable in connection with simulation system to identify the path of data packets through the network. The traffic routing subsystem 536 may identify a specific path associated with a particular data packet. In some embodiments, the traffic routing subsystem 536 may specify the configuration of each intermediate device. The traffic routing subsystem 536 may be configured to generate physically distinct paths for certain traffic flows, such as high priority traffic flows.

The traffic routing subsystem 536, may further include a failover path subsystem 538 configured to generate a failover path. The failover traffic flow generated by the failover path subsystem 538 may be utilized in the event that a primary flow path is disrupted. The particular failover traffic flow may be physically distinct from the primary flow path, so that the primary flow path and the failover traffic flow are not both susceptible to a single point of failure. In some embodiments, failover path subsystem 538 may further be configured to obtain user confirmation of an automatically generated failover communication path. As such, a user may inspect the automatically generated failover traffic flow and make adjustments as necessary before the failover traffic flow is implemented.

A query subsystem 534 may be configured to receive a query from a user that may allow a user to select a subset of results associated with a simulation. The query may be based on a variety of criteria, including a source, a destination, a priority, a data type, a data protocol, a MAC address, a VLAN identifier, and the like.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system configured to assess a traffic flow in a software defined network (SDN), the system comprising:
    a user-interface subsystem configured to receive from a user at least one simulation parameter associated with at least one packet to be simulated in the SDN;
    a simulation subsystem configured to:
        generate at least one packet based on the at least one simulation parameter;
        simulate a response to the at least one simulation parameter based on an iterative process, the iterative process configured to:
            identify at least one applicable traffic routing rule based on at least one attribute of the at least one packet;
            identify a subsequent destination based on the applicable traffic routing rule;
            add a record to a simulation result based on the subsequent destination;
            continue the iterative process until a terminating condition is satisfied;
    a representation subsystem configured to generate a representation of the simulation result; and,
    a controller configured to communicate traffic routing rules to a plurality of communication devices of the SDN.

2. The system of claim 1, wherein the user-interface subsystem is further configured to display a flow table associated with a device in the SDN based on a user action and to receive a change to the flow table.

3. The system of claim 1, wherein the representation comprises a graphical representation of each subsequent destination of the at least one packet.

4. The system of claim 3, wherein the graphical representation comprises the simulation result overlaid on a network diagram.

5. The system of claim 1, wherein the simulation subsystem is further configured to generate a failover path associated with the at least one packet and the representation subsystem is further configured to represent the failover path in the representation.

6. The system of claim 1, wherein the simulation parameter comprises a partial packet that satisfies a plurality of applicable traffic routing rules, and the representation reflects a plurality of potential routes of the partial packet.

7. The system of claim 1, wherein the attribute comprises one of a destination, a priority, a data type, a data protocol, a MAC address, a source, and a VLAN identifier.

8. The system of claim 1, further comprising a query subsystem, and wherein the simulation subsystem is further configured to identify a subset of the simulation results that satisfy the query.

9. The system of claim 1, wherein the terminating condition comprises one of the at least one data packet reaching a final destination and the at least one data packet being dropped.

10. The system of claim 1, wherein the user-interface subsystem is further configured to receive a limitation to restrict the response to a single communication flow in the SDN.

11. A method for assessing a traffic flow in a software defined network (SDN), the method comprising:
   receiving from a user at least one simulation parameter associated with at least one packet to be simulated in the SDN;
   generating at least one packet based on the at least one simulation parameter;
   simulating a response to the at least one simulation parameter using an iterative process, comprising:
      identifying at least one applicable traffic routing rule based on at least one attribute of the at least one packet;
      identifying a subsequent destination based on the applicable traffic routing rule;
      adding a record to a simulation result based on the subsequent destination; and
      continuing the iterative process until a terminating condition is satisfied;
   generating a representation of the simulation result;
   receiving a change to at least one traffic routing rule;
   updating the at least one traffic routing rule; and
   specifying traffic routing rules to a plurality of communication devices of the SDN.

12. The method of claim 11, wherein the representation comprises a graphical representation of each subsequent destination of the at least one packet.

13. The method of claim 11, further comprising: generating a failover path associated with the at least one packet; and wherein the representation further comprises the failover path.

14. The method of claim 11, wherein the simulation parameter comprises a partial packet that satisfies a plurality of applicable traffic routing rules, and the representation reflects a plurality of potential routes of the partial packet.

15. The method of claim 11, comprising:
   receiving a query from a user;
   identifying a subset of the simulation results satisfying the query.

16. The method of claim 15, wherein the query comprises an attribute associated with a communication flow in the SDN.

17. The method of claim 11, wherein the terminating condition comprises one of the at least one data packet reaching a final destination and the at least one data packet being dropped.

18. The method of claim 11, further comprising restricting the response to a single communication flow in the SDN.

19. The method of claim 11, further comprising displaying a flow table associated with and based on a user action.

* * * * *